United States Patent
Choo

(10) Patent No.: US 7,440,676 B2
(45) Date of Patent: Oct. 21, 2008

(54) METHOD AND APPARATUS FOR TRANSMITTING DUMMY VIDEO SYNC AND AUDIO SIGNALS IN OPTICAL DISC PLAYER

(75) Inventor: Jeong Hwan Choo, Cheonan-si (KR)

(73) Assignee: LG Electronics Inc., Seoul (KR)

( * ) Notice: Subject to any disclaimer, the term of this patent is extended or adjusted under 35 U.S.C. 154(b) by 882 days.

(21) Appl. No.: 10/644,995

(22) Filed: Aug. 21, 2003

(65) Prior Publication Data

US 2004/0047600 A1 Mar. 11, 2004

(30) Foreign Application Priority Data

Aug. 21, 2002 (KR) .................. 10-2002-0049473

(51) Int. Cl.
*H04N 7/087* (2006.01)
*H04N 5/00* (2006.01)
(52) U.S. Cl. ........................ 386/84; 386/126
(58) Field of Classification Search ............... 386/1, 386/12, 131, 71, 84
See application file for complete search history.

(56) References Cited

U.S. PATENT DOCUMENTS

| | | | | |
|---|---|---|---|---|
| 4,688,081 A * | 8/1987 | Furuhata et al. | ............. | 348/498 |
| 5,056,138 A | 10/1991 | Tyson, Sr. | | |
| 5,926,602 A * | 7/1999 | Okura | ............. | 386/13 |
| 6,222,983 B1 * | 4/2001 | Heo | ............. | 386/96 |
| 2001/0024568 A1 * | 9/2001 | Mori | ............. | 386/96 |
| 2002/0052732 A1 | 5/2002 | Akita | | |

FOREIGN PATENT DOCUMENTS

| | | |
|---|---|---|
| EP | 0242215 A2 | 10/1987 |
| EP | 0327751 A2 | 8/1989 |
| EP | 0635835 A2 | 1/1995 |
| EP | 0944087 A2 | 9/1999 |
| JP | 04-365284 | 12/1991 |

* cited by examiner

*Primary Examiner*—Thai Tran
*Assistant Examiner*—Tat Chi Chio
(74) *Attorney, Agent, or Firm*—Birch, Stewart, Kolasch & Birch, LLP

(57) ABSTRACT

A method and apparatus are provided for transmitting dummy video sync and audio signals in an optical disc player, which are capable of generating a dummy video sync signal when the optical disc player plays an audio-only optical disc. The method and apparatus transmit to a television the dummy video sync signal along with an audio signal read/reproduced from the optical disc. Accordingly, the invention prevents the television from being automatically turned off or switched to an audio mute state when only audio signals are reproduced from the disc without any reproduction of associated video signals. As a result, the user can hear audio sound through speakers equipped in the television even though only audio signals are reproduced from the disc.

26 Claims, 2 Drawing Sheets

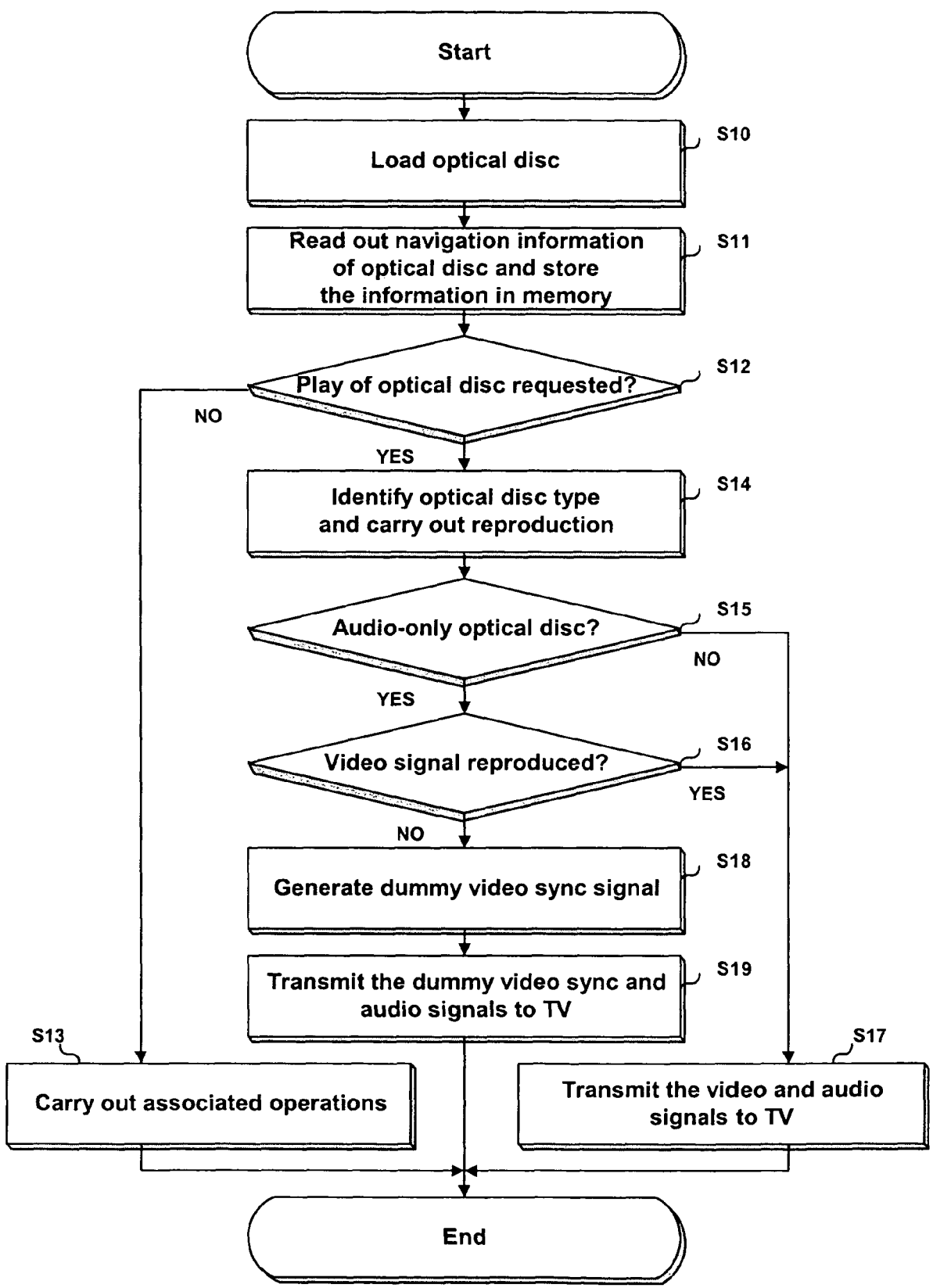

METHOD AND APPARATUS FOR TRANSMITTING DUMMY VIDEO SYNC AND AUDIO SIGNALS IN OPTICAL DISC PLAYER

The present application claims, under 35 U.S.C. § 119, the priority benefit of Korean Patent Application No. 02-49473 filed Aug. 21, 2002,the entire contents of which are herein fully incorporated by reference.

BACKGROUND OF THE INVENTION

1. Field of the Invention

The present invention relates to a method and apparatus for transmitting dummy video sync and audio signals in an optical disc player such as a DVD player, adapted to transmit to a television, audio signals read/reproduced from an audio-only optical disc such as a CD, an optical disc recorded with MP3 audio data, or a DVD Audio disc.

2. Description of the Related Art

Recently, optical discs capable of recording a large quantity of high-quality video and audio data, such as DVDs, have been developed and made commercially available.

In association with such optical discs, optical disc players such as DVD players have also been developed and made commercially available. Such optical disc players serve to read/reproduce video and audio data recorded on an optical disc, so as to allow the video and audio data to be displayed on the screen of a television and outputted through speakers, respectively.

Meanwhile, for audio-only optical discs such as general CDs, optical discs recorded only with MP3 audio data, or DVD Audio discs, a DVD player can read/reproduce audio data recorded on such an optical disc, and transmit the reproduced signals to a television.

However, when receiving audio signals without any video signal associated with those audio signals, for more than a prescribed time, the television connected to the DVD player determines that it abnormally receives external input signals. Based on such a determination, the television automatically mutes the audio signals outputted through its speakers, or is automatically turned off. For this reason, where only audio signals are read/reproduced from an optical disc, the user cannot hear any normal audio sound through the speakers equipped in the television.

SUMMARY OF THE INVENTION

Therefore, the present invention has been made to solve the above mentioned problems.

An object of the invention is to provide a method and apparatus for transmitting dummy video sync and audio signals in an optical disc player which is capable of generating a dummy video sync signal when the optical disc player plays an audio-only optical disc such as a CD, an optical disc recorded with MP3 audio data, or a DVD Audio disc, and transmitting the dummy video sync signal along with an audio signal read/reproduced from the optical disc.

Another object of the present invention is to provide a method and apparatus for transmitting dummy video sync and audio signals in an optical disc player, which overcome limitations and disadvantages of the related art.

In accordance with the an aspect of present invention, a method for generating dummy video sync signals in a data recording medium player, the method comprising reading out a signal recorded on a data recording medium and reproducing the read-out signal, generating a dummy video sync signal when there is no video signal included in the reproduced signal, and transmitting, to an output device, the dummy video sync signal along with the reproduced signal, the reproduced signal including an audio signal, but no video signal.

In accordance with an aspect of the present invention, an apparatus for generating dummy video sync signals and usable in a data recording medium player, includes a configured unit for reading out a signal recorded on a data recording medium and reproducing the readout signal; a configured unit for generating a dummy video sync signal when there is no video signal included in the reproduced signal; and a configured unit for transmitting, to an output device, the dummy video sync signal along with the reproduced signal, the reproduced signal including an audio signal, but no video signal.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above objects, and other features and advantages of the present invention will become more apparent after a reading of the following detailed description when taken in conjunction with the drawings, in which:

FIG. 2 is a flow chart illustrating a method for transmitting dummy video sync and audio signals in the optical disc player in accordance with an embodiment of the present invention.

DESCRIPTION OF THE PREFERRED EMBODIMENTS

Figure 1:
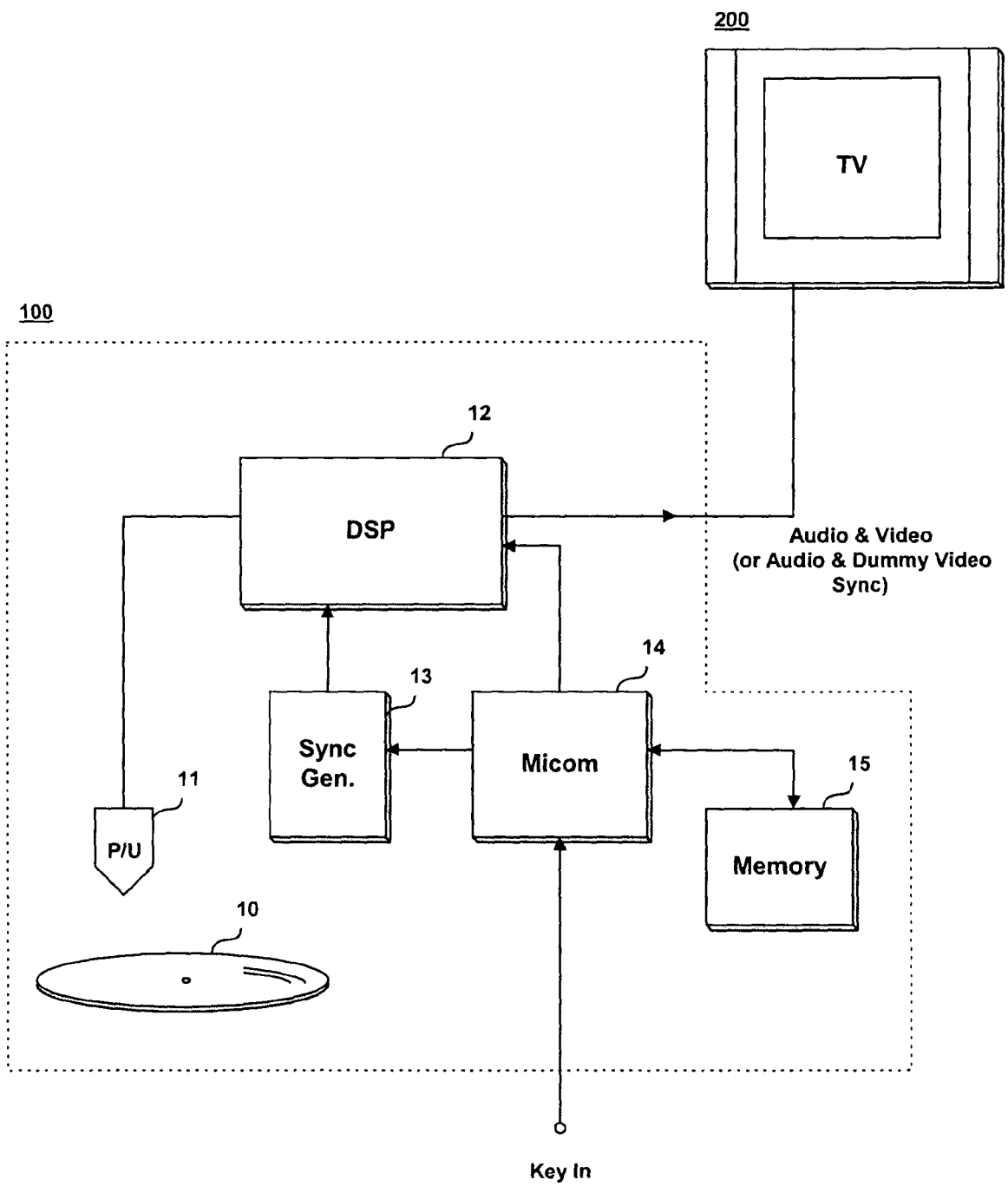
FIG. 1 is a block diagram illustrating an optical disc player to which a dummy video sync and audio signal transmitting method according to the present invention is applied.

Now, a method for transmitting dummy video sync and audio signals in an optical disc player in accordance with preferred embodiments of the present invention will be described with reference to the annexed drawings.

FIG. 1 is a block diagram illustrating an optical disc player to which the dummy video sync and audio signal transmitting method according to the present invention is applied. As shown in FIG. 1, the optical disc player, for example, a DVD player 100, includes an optical pickup (P/U) 11 for reading out a signal recorded on an optical disc 10 or other type of data recording medium in the form of a radio frequency (RF) signal, and a digital signal processor (DSP) 12 for processing the RF signal read out by the optical pickup 11 to reproduce a video and/or audio signal.

The optical disc player also includes a microcomputer (Micom) 14 for controlling the operation of the digital signal processor 12, a sync signal generating unit (Sync Gen.) 13 for generating a dummy video sync signal with a prescribed period under the control of the microcomputer 14, and a memory 15 for storing information and data required for the control operation of the microcomputer 14. The Micom 14 receives user inputs such as user commands and/or selections and processes them appropriately as known. All these components of FIG. 1 are operatively coupled.

The audio and video signals, or audio and dummy video sync signals outputted from the DVD player 100 are transmitted to a television 200 connected to the DVD player 100, as shown in FIG. 1.

Where the optical disc 10 loaded in the DVD player 100 is an audio-only optical disc type or an optical disc type capable of reading/reproducing only audio data, the microcomputer 14 controls the operation of the sync signal generating unit 13 in order to perform operations of transmitting, to the television 200, a dummy video sync signal with a prescribed period along with an audio signal outputted from the digital signal processor 12. These operations will be described in detail hereinafter.

FIG. 2 is a flow chart illustrating the method for transmitting dummy video sync and audio signals in the optical disc player in accordance with an embodiment of the present invention. This method is implemented in a system shown in FIG. 1 or in other suitable systems. In accordance with this method, when the optical disc 10 (or other type of data recording medium) is loaded in the DVD player 100 (S10), the microcomputer 14 of the DVD player 100 first carries out download operations of reading out navigation information written in a lead-in area of the optical disc 10, and storing the read-out navigation information in the memory 15 (S11).

When a play operation of an optical disc is requested (S12), the microcomputer 14 retrieves the navigation information stored in the memory 15 to identify the type of the optical disc 10, and controls the digital signal processor 12 to perform a reproduction operation meeting the type of the optical disc 10 (S14). But if a play operation of the optical disk is not requested at step S12, then the microcomputer 14 or other suitable unit(s) of the DVD player 100 carry out other operations as needed or requested by a user (S13).

If the identified disc type corresponds to the type of an audio-only optical disc such as a CD, an optical disc recorded only with MP3 audio data, or a DVD Audio disc (S15), then the microcomputer 14 checks whether or not there is a video signal read/reproduced from the optical disc 10 (S16).

On the other hand, if the identified disc type corresponds to the type of a general DVD disc recorded with both the audio and video signals, or when there is a video signal read/reproduced from the optical disc 10, the microcomputer 14 controls the digital signal processor 12 to transmit, to the television 200, the video and audio signals reproduced in accordance with the signal processing operation of the DSP 12 (S17). Also at step S16, if for some reason, a video signal is reproduced from the audio-only optical disc, the process performs step S17 discussed above.

If there is no video signal read/reproduced from the optical disc 10 at step S16, that is, only an audio signal is read out and reproduced, the microcomputer 14 controls the sync signal generating unit 13 to generate a dummy video sync signal with a prescribed period (S18). The microcomputer 14 then controls the digital signal processor 12 to transmit, to the television 200, the audio signal read/reproduced from the optical disc 10 along with the dummy video sync signal with a prescribed period. That is, the dummy video sync signal with the same frequency as the sync signal frequency of general video signals is sent to the television 200 (Sl9).

In the method of FIG. 2, step S16 may be an optional step. Without step S16, the method would proceed directly to step S18 from step S15 to generate the dummy video sync signal when step S15 determines that the optical disc is an audio-only disc. That is, the DVD player 100 would presume that no video signal is stored on the optical disc if it is determined that the disc is an audio-only disc. However, as an extra step of assurance, if step S16 is included, step S16 would ensure that there is no video signal stored on the optical disc even if initially the disc has been determined to be an audio-only disc type at step S15.

For reference, in the case of general video signals, their horizontal sync signal has a frequency of 15.734 Hz for the NTSC system, and a frequency of 16.625 Hz for the PAL system, whereas their vertical sync signal has a frequency of 60 Hz for the NTSC system, and a frequency of 50 Hz for the PAL system.

Accordingly, when receiving video and audio signals reproduced and transmitted in the above described manner, the television 200 normally displays the video signal on a screen equipped therein while normally outputting the audio signal through speakers equipped therein. Also, when receiving the dummy video sync and audio signals, the television 200 displays a black image on the screen in accordance with the dummy video sync signal while normally outputting the audio signal through the speakers.

Here, although the use of the television 200 has been discussed to display the video signals and output the audio signals from the DVD player 100, the invention is not limited such, but encompasses the use of other display/output device capable of displaying video signals and outputting audio signals audibly.

Thus, the user can normally hear the audio signals read/reproduced from an audio-only optical disc, through the speakers of the television, even though no video signal was reproduced from the optical disc.

As apparent from the above description, the present invention provides a method and apparatus for transmitting dummy video sync and audio signals in an optical disc player, which are capable of generating a dummy video sync signal that can prevent a television, adapted to receive signals transmitted from the optical disc player, from being automatically turned off or switched to an audio mute state when only audio signals are reproduced without reproduction of any associated video signals as the optical disc player plays an audio-only optical disc such as a CD, an optical disc recorded with MP3 audio data, or a DVD Audio disc. The method and apparatus transmit the dummy video sync signal along with an audio signal read/reproduced from the optical disc.

Accordingly, the present invention is very useful in that the user can hear audio sound through speakers equipped in the television even when only audio signals are reproduced without the reproduction of any associated video signals.

Although the preferred embodiments of the invention have been disclosed for illustrative purposes, those skilled in the art will appreciate that various modifications, additions and substitutions are possible, without departing from the scope and spirit of the invention as disclosed in the accompanying claims. For instance, the optical disc player, to which the present invention is applied, is not limited to a DVD player, but can be any suitable device capable of reproducing signals from an optical recording medium.

What is claimed is:

1. A method for generating dummy video sync signals in a data recording medium player, the method comprising:
   reading out a signal recorded on a data recording medium and reproducing the read-out signal;
   generating a dummy video sync signal when there is only an audio signal and no video signal included in the reproduced signal; and
   transmitting, to an output device, the dummy video sync signal along with the reproduced signal, the reproduced signal including the audio signal, but no video signal,
   wherein the dummy video sync signal has a same frequency as a sync signal frequency of a general video signal such that the output device displays an image corresponding to the dummy video sync signal having the same frequency as the sync signal frequency of the general video signal and outputs the audio signal via a speaker associated with the output device.

2. The method according to claim 1, further comprising:
if there are video and audio signals in the reproduced signal, transmitting the video and audio signals in the reproduced signal to the output device.

3. The method according to claim 1, wherein the data recording medium is an optical disc.

4. The method according to claim 3, wherein the optical disc is an audio-only optical disc, whereby the dummy video sync signal is transmitted to the output device, along with an audio signal read/reproduced from the audio-only optical disc.

5. The method according to claim 4, wherein the audio-only optical disc is a CD or an optical disc recorded with MP3 audio data.

6. The method according to claim 4, wherein the audio-only optical disc is a DVD audio disc.

7. The method according to claim 1, wherein the data recording medium player is an optical disc player, such that the reading out and reproducing steps are performed in the optical disc player.

8. The method according to claim 7, wherein the generating and transmitting steps are performed by the optical disc player.

9. The method according to claim 1, wherein in the transmitting step, the output device is a television.

10. The method according to claim 1, further comprising:
reading out navigation information stored on the data recording medium; and
storing the read navigation information in a storage unit of the data recording medium player.

11. The method according to claim 10, further comprising:
identifying a type of the data recording medium based on the navigation information, when a play operation is requested; and
determining whether or not the data recording medium is an audio-only recording medium based on the identifying result.

12. The method according to claim 11, wherein the generating step includes:
determining whether or not there is a video signal included in the reproduced signal even if the determining step determines that the data recording medium is an audio-only recording medium.

13. The method according to claim 11, wherein the generating step determines that there is no video signal included in the reproduced signal if the determining step determines that the data recording medium is an audio-only recording medium.

14. An apparatus for generating dummy video sync signals and usable in a data recording medium player, the apparatus comprising:
a unit configured to read out a signal recorded on a data recording medium and reproduce the read-out signal;
a generating unit configured to. generate a dummy video sync signal when there is only an audio signal and no video signal included in the reproduced signal; and
a transmitting unit configured to transmit, to an output device, the dummy video sync signal along with the reproduced signal, the reproduced signal including the audio signal, but no video signal,
wherein the dummy video sync signal has a same frequency as a sync signal frequency of a general video signal such that the output device displays an image corresponding to the dummy video sync signal having the same frequency as the sync signal frequency of the general video signal and outputs the audio signal via a speaker associated with the output device.

15. The apparatus according to claim 14, wherein,
if there are video and audio signals in the reproduced signal, the transmitting unit transmits the video and audio signals in the reproduced signal to the output device.

16. The apparatus according to claim 14, wherein the data recording medium is an optical disc.

17. The apparatus according to claim 16, wherein the optical disc is an audio-only optical disc, whereby the dummy video sync signal is transmitted to the output device, along wit an audio signal read/reproduced from the audio-only optical disc.

18. The apparatus according to claim 17, wherein the audio-only optical disc is a CD or an optical disc recorded with MP3 audio data.

19. The apparatus according to claim 17, wherein the audio-only optical disc is a DVD audio disc.

20. The apparatus according to claim 14, wherein the data recording medium player is an optical disc player, such that the unit to read out and reproduce is present in the optical disc player.

21. The apparatus according to claim 20, wherein the generating unit and the transmitting unit are present in the optical disc player.

22. The apparatus according to claim 14, wherein the output device is a television.

23. The apparatus according to claim 14, further comprising:
a unit configured to read navigation information stored on the data recording medium; and
a unit configured to store the read navigation information in a storage unit of the data recording medium player.

24. The apparatus according to claim 23, further comprising:
a unit configured to identify a type of the data recording medium based on the navigation information, when a play operation is requested; and
a unit configured to determine whether or not the data recording medium is an audio-only recording medium based on the identification result.

25. The apparatus according to claim 24, wherein the generating unit includes:
a second unit configured to determine whether or not there is a video signal included in the reproduced signal even if it is determined that the data recording medium is an audio-only recording medium.

26. The apparatus according to claim 24, wherein the generating unit determines that there is no video signal included in the reproduced signal if it is determined that the data recording medium is an audio-only recording medium.

* * * * *